US 9,112,665 B2

(12) United States Patent
Eudes et al.

(10) Patent No.: US 9,112,665 B2
(45) Date of Patent: Aug. 18, 2015

(54) METHOD OF TRANSMISSION WITH MECHANISM FOR ADAPTING MODES OF CODING AND OF DYNAMIC RANGE MODULATION

(71) Applicant: THALES, Neuilly sur Seine (FR)

(72) Inventors: Jacques Eudes, Gennevilliers (FR); Marc Touret, Gennevilliers (FR); Jullien Pailler, Gennevilliers (FR)

(73) Assignee: THALES, Neuilly sur Seine (FR)

( * ) Notice: Subject to any disclaimer, the term of this patent is extended or adjusted under 35 U.S.C. 154(b) by 109 days.

(21) Appl. No.: 14/046,746

(22) Filed: Oct. 4, 2013

(65) Prior Publication Data

US 2014/0105128 A1    Apr. 17, 2014

(30) Foreign Application Priority Data

Oct. 5, 2012  (FR) ...................................... 12 02672

(51) Int. Cl.
*H04L 5/00* (2006.01)
*H04L 1/00* (2006.01)

(52) U.S. Cl.
CPC .............. *H04L 5/006* (2013.01); *H04L 1/0001* (2013.01)

(58) Field of Classification Search
CPC .............................. H04L 5/006; H04L 1/0001
See application file for complete search history.

(56) References Cited

U.S. PATENT DOCUMENTS

| 6,438,116 | B1   |   | 8/2002  | Corbett |
|-----------|------|---|---------|---------|
| 6,813,476 | B1   | * | 11/2004 | Brooker .......................... 455/10 |
| 2002/0058505 | A1 | * | 5/2002  | Kim et al. ...................... 455/427 |
| 2003/0054816 | A1 | * | 3/2003  | Krebs et al. ................... 455/428 |
| 2004/0151122 | A1 |   | 8/2004  | Lau et al. |
| 2006/0221847 | A1 |   | 10/2006 | Dacosta |
| 2009/0060015 | A1 | * | 3/2009  | Beadle .......................... 375/227 |
| 2011/0021137 | A1 | * | 1/2011  | Laufer .......................... 455/13.4 |
| 2012/0287813 | A1 |   | 11/2012 | Alm et al. |

FOREIGN PATENT DOCUMENTS

| WO | 00/04650 A1    | 1/2000  |
| WO | 2006/104596 A2 | 10/2006 |
| WO | 2006/104596 A3 | 10/2007 |
| WO | 2011/096862 A1 | 8/2011  |

OTHER PUBLICATIONS

French Search Report and Written Opinion dated Aug. 1, 2013, which issued during the prosecution of French Patent Application No. 1202672.

* cited by examiner

*Primary Examiner* — Albert T Chou
(74) *Attorney, Agent, or Firm* — Troutman Sanders LLP

(57) ABSTRACT

The method of transmission between a transmitter and a receiver using a mode of adaptive modulation and coding, wherein the modulation and coding are selected based on the comparison of a characteristic variable of the signal to noise ratio measured by the receiver with a threshold value plus a margin, which margin is variable depending on the prior change in the signal to noise ratio.

The margin changes based on a statistical function of a higher order than 1 of the characteristic variable of the signal to noise ratio measured by the receiver over at least one time horizon.

6 Claims, 2 Drawing Sheets

METHOD OF TRANSMISSION WITH MECHANISM FOR ADAPTING MODES OF CODING AND OF DYNAMIC RANGE MODULATION

CROSS-REFERENCE TO RELATED APPLICATIONS

The present application claims priority to French Patent Application No. 1202672 filed Oct. 5, 2012. This application is incorporated herein by reference in its entirety.

FIELD OF THE INVENTION

The present invention relates to a method of transmission between a transmitter and a receiver using a mode of adaptive modulation and coding, wherein the modulation and coding are selected based on the comparison of a characteristic variable of the signal to noise ratio measured by the receiver with a threshold value plus a margin, which margin is variable depending on the prior change in the signal to noise ratio.

BACKGROUND OF THE INVENTION

The transmissions, in particular by satellite in the Ka (K-above) and EHF (Extremely High Frequency) bands are sensitive to various different phenomena that can degrade the budget of the link between a transmitter and a receiver. These phenomena can lead to very rapid variations, such as masking or interference. The connection of the link can then be reduced by several decibels per second.

Other phenomena, such as weather related variations, in particular rain fade or antenna pointing errors have rapid effects that lead to a reduction of the gain by a few tenths of decibels per second.

Finally, other phenomena, such as the geographic location or situation of the receiver when it is mobile may result in slower variations of the gain of the link of the order of a hundredth of a decibel per second.

In order to be better adapted to these variations, mechanisms for adapting the modes of modulation and coding have been implemented. The goal is to dynamically adapt the parameters of the waveform so as to be well adapted to the link budget. This mechanism is known by the acronym AMC in English, for "Adaptive Modulation and Coding".

As it is known per se, the AMC mechanism makes it possible, by comparing the signal to noise ratio to the baseline reference values to define the mode of modulation and coding adapted to the conditions of the link.

The propagation of information between the entities of the chain of transmission for transmitting the information pertaining to the state of communication and orders of change in modulation and coding requires a substantial amount of time, so that when the signal to noise ratio decreases, it takes a certain amount of time for the transmitter to be able to react to this decrease.

In order to ensure that the signal to noise ratio of the link is never less than a baseline reference signal to noise ratio necessary for the receiver, it is a well known practice to provide for a margin, added to the baseline reference signal to noise ratio in order to anticipate the losses of the link budget and to be able to change the modulation and coding early enough before the conditions become far too degraded.

This margin is called AMC margin.

The AMC margin depends on the worst case scenario variation of link budget to which the transmission system must be resistant as well as the reaction time of the system.

In general, the AMC margin is static and is of the order of 2 to 3 decibels for transmissions in the Ka band and the AMC margin may be higher in the EHF band.

When the conditions for signal propagation are stable, typically with a clear sky, the margin is unnecessary since the signal to noise ratio does not vary. The transmission power is thus 2 to 3 decibels higher than necessary thereby causing a decrease of the speed or the bandwidth of the order of 50% to 100%.

It is a known technique to make the AMC margin vary based on the historical information related to the change in the signal to noise ratio.

These solutions have the drawback of sometimes impose unnecessarily high AMC margins. The variation in signal to noise ratio may be of the order of 20 decibels, leading to the possibility of retaining an AMC margin of around several decibels, without this improving the communication, the phenomena deemed to have caused the variation in signal to noise ratio having been very brief and thus not having needed to be compensated for by a change in modulation or coding.

The aim of the invention is to provide a method of transmission with adaptive modulation and coding in which the changing of the AMC margin:
  makes possible the optimisation of the transmission power when conditions for signal propagation are stable
  does not lead to changes in the mode of coding or modulation considered unnecessary, in particular in the event of masking or interference.

SUMMARY OF THE INVENTION

To this end, the object of the invention relates to a method of transmission of the aforementioned type, characterized in that the margin changes based on a statistical function with an order greater than 1 of the characteristic variable of the signal to noise ratio measured by the receiver over at least one time horizon.

According to particular embodiments of implementation, the method comprises of one or more of the following characteristic features:
  the margin changes based on a linear combination of statistical functions with an order greater than 1 of the characteristic variable of the signal to noise ratio measured by the receiver over several time horizons of different lengths;
  the number of time horizons considered is between 2 and 4;
  the or each time horizon has a duration between 2 and 90 seconds;
  the statistical function depends on the standard deviation of the characteristic variable of the signal to noise ratio measured by the receiver;
  the statistical function depends on the standard deviation of the characteristic variable of the signal to noise ratio measured by the receiver or on a predetermined maximum value of the standard deviation if the standard deviation of the characteristic variable of the signal to noise ratio measured by the receiver is greater than the maximum value;
  the said method includes the calculation of a predicted signal to noise ratio that corresponds to the difference between the measured signal to noise ratio minus at least one variable margin, and the modulation and coding are selected based on the comparison of the predicted signal to noise ratio with a threshold value plus a fixed margin.

BRIEF DESCRIPTION OF THE DRAWINGS

The invention will be better understood upon reading the description which follows, provided solely by way of example and with reference made to the drawings in which.

DETAILED DESCRIPTION OF PREFERRED EMBODIMENTS

Figure 1:
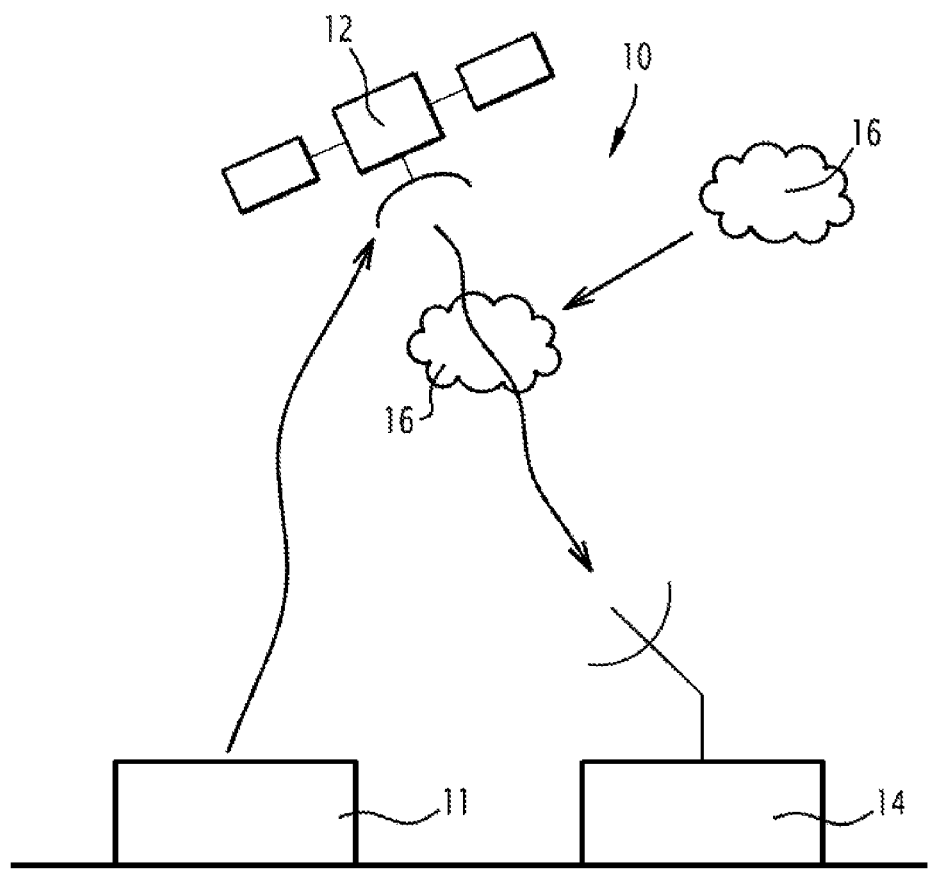
FIG. 1 is a schematic view of a transmission installation for the implementation of the method according to the invention.

In FIG. 1 a transmission installation 10 is represented that demonstrates the implementation of a transmitting station 11 a satellite 12 and a ground receiving station 14. The transmission takes place for example by band or in EHF band from the transmitting station 11 to the ground station 14 via satellite 12, by any known means considered suitable. In a similar fashion, the transmission also takes place in the reverse direction.

The transmission method implements a mechanism for adapting the modes of modulation and coding known by the acronym AMC in English for "Adaptive Modulation and Coding" that makes it possible to dynamically adapt the parameters of the waveform so as to be well adapted to the link budget.

The ground station 14 includes the means for transmitting to the station 11 via the satellite 12 the information concerning the measured characteristics of the transmission, and the requests made by the receiving station in order to satisfy its needs.

The station 11 comprises, as is known per se the means for determination of the mode of modulation and coding to be used for the transmission based on the information received from the station 14, in particular depending on the signal to noise ratio required by the station 14, this latter being denoted by $C/N_{0\_predicted}$.

By design, the station 11 is capable of determining the mode of modulation and coding selected by comparison of the signal to noise ratio required by the ground station 14 $C/N_{0\_predicted}$ with a baseline reference signal to noise ratio $C/N_{0\_ref}$ plus a fixed AMC margin, denoted by $Margin_{fixe}$. The fixed AMC margin $Margin_{fixe}$ is for example equal to 0.5 decibels (dB).

This figure also provides an illustration of the clouds 16, which can degrade the conditions of transmission, and thereby reduce the signal to noise measured by the ground station 14, possibly requiring the modification of the mode of modulation and coding.

As is known per se, the transmission is carried out by frame, also called packet according to the mode of modulation and coding.

Figure 2:
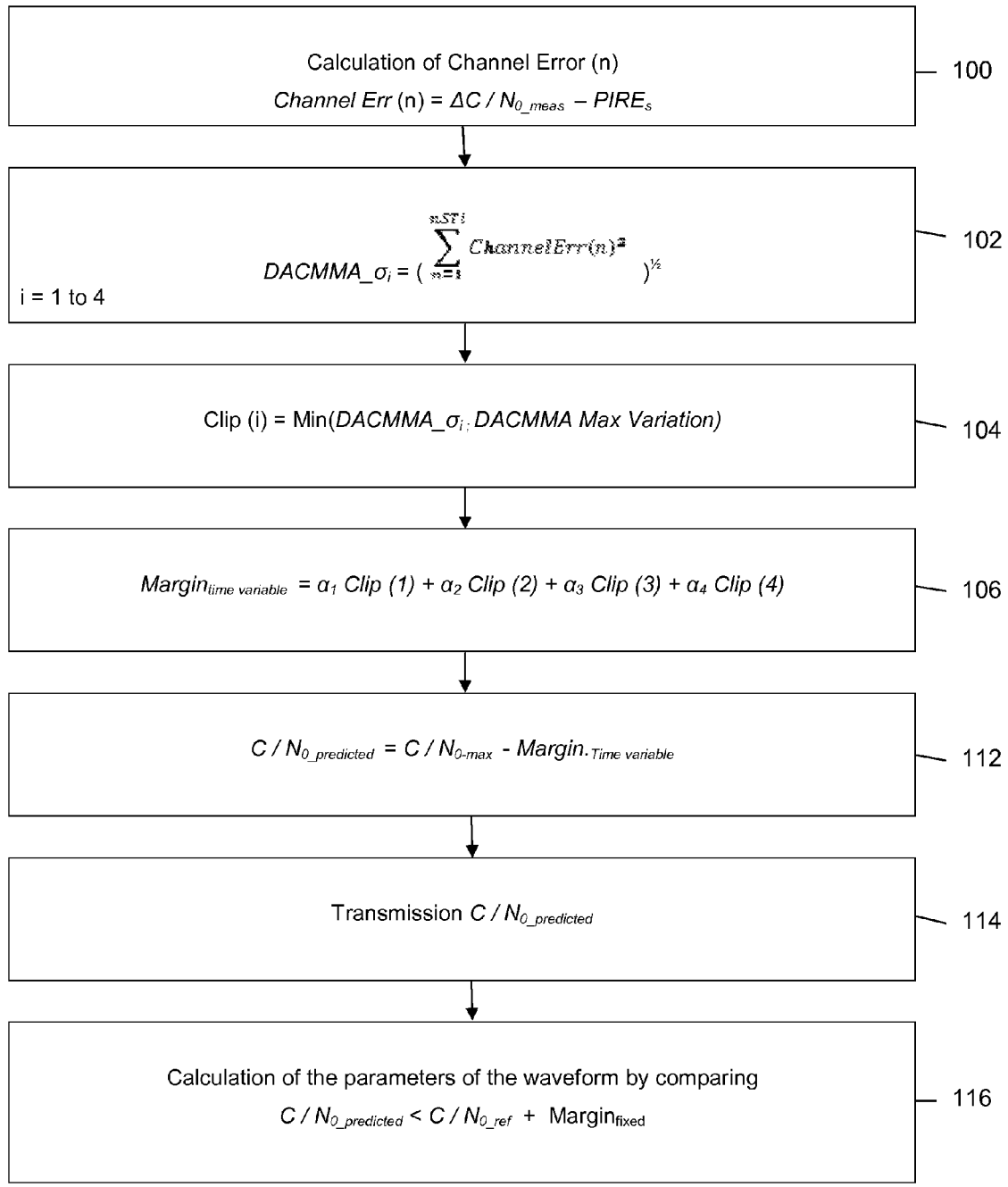
FIG. 2 is a flowchart of the algorithm for determination of the modes of modulation and coding in the transmission method according to the invention.

The algorithm described with reference to FIG. 2 is set to run continuously during the transmission partially in the ground station 14 and in the station 11 by the means for computing that deploy the appropriate computer programmes.

As illustrated in FIG. 2, during the transmission and for each group of n of k frames a channel error denoted by ErrCanal(n) is calculated during the step 100 by the receiver, that is, the ground station 14 in the example considered. A group of k frames is called super frame SF (k is chosen in order for the duration of a super frame to be of the order of 100 ms so as to be statistically significant). This channel error is the difference between the signal to noise ratio measured by the ground station 14 over the super frame n denoted by $\Delta C/N_{0\_meas\_ST\_n}$ and the transmission power of the station 11 denoted by $PIRE_{Consigne\_ST\_n}$.

Thus, $ErrCanal(n) = \Delta C/N_{0\_meas\_ST\_n} - PIRE_{Consigne\_ST\_n}$.

During the step 102, and for several different time horizons numbered i, the standard deviation of the channel denoted by $DACMMA\_\sigma_i$ is determined by the receiver over the $N_i$ last seconds constituting the time horizon i considered.

For example, the time horizons constitute periods of 3, 10, 30 and 60 seconds such that $N_1=3$; $N_2=10$; $N_3=30$; $N_4=60$.

Thus, the standard deviation of the channel error for a determined time horizon i is given by $$DACMMA\_\sigma_i = \left[\frac{1}{nST_i}\sum_{n=1}^{nST_i} ChannelErr(n)^2 - \left(\frac{1}{nST_i}\sum_{n=1}^{nST_i} ChannelErr(n)\right)^2\right]^{1/2}$$

wherein
$nST_i$ is the number of super frames in the time horizon i. During the step 104 a narrow (bounded) standard deviation is determined for each time horizon i by the receiver. This narrow standard deviation is denoted by Clip(i) and is given by Clip $(i)=Min(DACMMA\_\sigma_i;$ DACMMA MaxVariation) wherein DACMMA MaxVariation is a constant. Thus, the narrow standard deviation is equal to the standard deviation of the channel error if the latter is less than a predetermined maximum value of the standard deviation denoted by DACMMA MaxVariation or equal to the predetermined maximum value of the standard deviation if not, this being so in order to not take into account extremely large variations in the standard deviation.

During step 106, the receiver determines a time variable margin constituted by a linear combination of narrow standard deviations Clip(i) calculated over the four time horizons. Thus, the time variable margin is written as follows $Margin_{time\ variable} = \alpha_1$ Clip $(1) + \alpha_2$ Clip $(2) + \alpha_3$ Clip $(3) + \alpha_4$ Clip $(4)$ where $\alpha_1$, $\alpha_2$, $\alpha_3$ and $\alpha_4$ are non zero positive real numbers. By default, the coefficients $á_1$, $á_2$, $á_3$ and $á_4$ are all taken to be equal to 1.

During the step 112, the receiver calculates a predicted signal to noise ratio denoted by $C/N_{0\_predicted}$ which corresponds to the difference between the measured signal to noise ratio minus the variable margin calculated in step.

Thus $C/N_{0\_predicted} = C/N_{0\_meas} - Margin_{time\ variable}$.

It is conceivable that with such a method, the AMC margin can be maintained at a highly reduced level during periods of low variation in the signal to noise ratio, in particular the periods with clear skies and that the AMC margin is shown to be increased in a rapid manner during significant but not abrupt changes in the signal to noise ratio, thereby making it possible to adequately anticipate the modifications in mode of modulation and coding in order for the signal to noise ratio to be maintained in all circumstances at a level higher than the signal to noise ratio required by the receiver, without the signal to noise ratio however being constantly much higher than the signal to noise ratio required at the receiver, in particular during periods of clear weather conditions.

The invention claimed is:

1. A method of transmission between a transmitter and a receiver, comprising the steps of:
    using a mode of adaptive modulation and coding,
    selecting the modulation and coding based on the comparison of a characteristic variable of the signal to noise ratio measured by the receiver with a threshold value plus a margin, which margin is variable depending on the prior change in the signal to noise ratio
    changing the margin based on a statistical function with an order greater than 1 of the characteristic variable of the signal to noise ratio measured by the receiver over at least one time horizon, and calculating a predicted signal to noise ratio that corresponds to the difference between the measured signal to noise ratio minus at least one variable margin, wherein the modulation and coding are selected based on the comparison of the predicted signal to noise ratio with a threshold value plus a fixed margin.

2. The method according to claim 1, wherein the step of changing the margin is based on a linear combination of statistical functions with an order greater than 1 of the characteristic variable of the signal to noise ratio measured by the receiver over a plurality of time horizons of different lengths.

3. The method according to claim 2, wherein the number of time horizons considered is between 2 and 4.

4. The method according to claim 1, wherein the at least one time horizon has a duration comprised of between 2 and 90 seconds.

5. The method according to claim 1, wherein the statistical function depends on the standard deviation of the characteristic variable of the signal to noise ratio measured by the receiver.

6. The method according to claim 1, wherein the statistical function comprises the standard deviation of the characteristic variable of the signal to noise ratio measured by the receiver or on a predetermined maximum value of the standard deviation if the standard deviation of the characteristic variable of the signal to noise ratio measured by the receiver is greater than the maximum value.

\* \* \* \* \*